United States Patent [19]
Foster et al.

[11] 3,857,188
[45] Dec. 31, 1974

[54] CALCULATING INCLINOMETER FOR LEVELLING RECREATION VEHICLES

[75] Inventors: Jack B. Foster, Anaheim; Jack F. Antes, Tustin, both of Calif.

[73] Assignee: Super Seer Corporation, Evergreen, Colo.

[22] Filed: Feb. 13, 1974

[21] Appl. No.: 441,949

[52] U.S. Cl. .................................................. 33/388
[51] Int. Cl. ............................................. G01c 9/28
[58] Field of Search .............................. 33/383–388

[56] References Cited
UNITED STATES PATENTS
1,829,257   10/1931   Best et al. ............................. 33/383
FOREIGN PATENTS OR APPLICATIONS
905,216   9/1962   Great Britain ........................ 33/379

Primary Examiner—Harry N. Haroian
Assistant Examiner—Charles E. Phillips
Attorney, Agent, or Firm—Richard D. Law

[57] ABSTRACT

A calculating inclinometer for levelling recreation vehicles such as pickup campers, trailers, mobile homes or the like includes a flat rectangular base plate having upright end members for supporting an arcuate rail in spaced relation above said base plate and a bubble level slidably mounted on the rail has a pointer which extends towards said base plate. A rectangular calculating plate, slidably arranged under the arcuate rail, includes a calibrated grid which can be laterally positioned below said slide rail to a predetermined position correspondonding to the dimensions of vehicle being levelled. With the inclinometer positioned on the recreation vehicle, the bubble level is moved along the slide rail to a level position, and the pointer shows the side and actual distance the vehicle must be raised to effect a level position.

8 Claims, 8 Drawing Figures

CALCULATING INCLINOMETER FOR LEVELLING RECREATION VEHICLES

This invention is directed to a calculating inclinometer for recreation vehicles. It is more specifically directed to a slidable bubble level inclinometer arranged in combination with a positionable calculating grid to determine actual levelling requirements.

Inclinometers of all types have been known for many years, but primarily these devices consist of a bubble level which can be rotated or variably positioned to show the degree of tilt of the object being measured. All of these devices in some way utilize a bubble level to indicate an angular deviation from the level reference plane. The angular degree between this reference plane and the base of the device indicates the degree of tilt. These types of devices are well known in the prior art but are limited to the fact that they can only determine the angular measurement. No provision has been included for automatically calculating the actual height corrections for the object or vehicle to be levelled. This specific measurement is the information that is desired for quickly and effectively levelling the vehicle. With the devices presently known in the prior art, the actual calculation must be mentally determined by the user, or found by trial and error.

It is, therefore, an object of the present invention to provide an inclinometer which can automatically calculate and determine the distance and direction correction required for levelling an object or vehicle.

It is another object of the present invention to provide a durable inclinometer wherein the bubble level indicator is accurate irrespective of the amount of wear and use given to the device.

It is a still further object of the present invention to provide an inclinometer which is completely self-calculating and which is both simple and inexpensive to manufacture.

It is a further object of the present invention to provide a calculating inclinometer which is easy to operate and quickly understood by the user with a minimum of instruction so that the object or vehicle can be rapidly levelled after making only one or two measurements.

It is a still further object of the present invention to provide a calculating inclinometer which includes an indicia capable of being used on a variety of vehicles of different types and sizes whereby the device can be used universally as required.

The present invention describes an inclinometer which is combined with a calculating slide grid arrangement. The device includes a flat base member supporting a continuously arcuate concave slide rail spaced a short distance above the base member so that the ends of the rail are an equal distance from the base member. In this way the center portion of the rail corresponds to the center line of the base member and is the point closest to the base member. A bubble level indicator suitably mounted in a saddle arranged for slidable mounting on the flanges of the slide rail is arranged so that when the saddle is positioned at the center of the rail, the level indicator will be parallel to the plane of the base members. A pointer extends downwardly towards the base member on each side of the saddle and is arranged perpendicular to the level reference plane determined by the bubble level indicator.

An indicia marked calculating slide plate is positioned on the base member and arranged for lateral slide movement with respect to the arcuate slide rail. Tabs or dimples near the corners of the slide plate prevent the plate from being removed from its position below the slide rail. Two series of indicia markings are provided. One series of the markings are parallel lines, which are also parallel to the longitudinal axis of the slide rail. The second series of markings are transverse to the first series, and symmetrically converge toward an imaginary point on a lateral center line through the slide plate. This provides an equal number of lines on each side of the center line. The center line in turn is perpendicular to the first series of marks and to the longitudinal axis of the slide rail.

The first series of lines represent the spacing between the supports on each side of the recreation vehicle to be levelled, generally considered the width. The longitudinal line closest to the converging point of the lateral series represent the greatest distance between the levelling supports, for example, the longest trailer. The line at the opposite side of the first series represents the narrowest width between the supports. The spacing between these marks is arranged as a logarithmic progression.

The converging lines in the second or lateral series represent the levelling height requirements with the direction of the pointer to one or the other side of the center line representing the side to be raised to effect a level condition. The lateral lines are angularly spaced from the center line and are usually designated to represent the elevational correction in inches.

In the present invention, the base member, sides and arcuate slide rail can be molded from synthetic resins or plastics to form an integral unit. Any molding or casting process can be used and any moldable material, such as polyacrilate, polyvinyl chloride, polypropelene or the like, can be used if desired. The saddle for the bubble level indicator can also be molded from the same or similar moldable material. The bubble level is formed from a conventional bubble vial and is filled with a liquid that is non-freezing at usual environmental temperatures, such as alcohol, to prevent deterioration or breaking of the vial if the inclinometer is stored in a vehicle during cold weather. The slide plate can be formed from any flat sheet material such as aluminum, copper, steel, plastics or the like. Although the lines on the plate can be inscribed into the surface and filled with a paint material to make them more visible, it is also possible to cast the lines into the surface of the material in an embossed fashion is a plastic moldable material is used.

Other objects of this invention will appear in the following description and appended claims, reference being made to the accompanying drawings forming a part of the specification where like reference characters designate corresponding parts in the several views.

Figure 1:
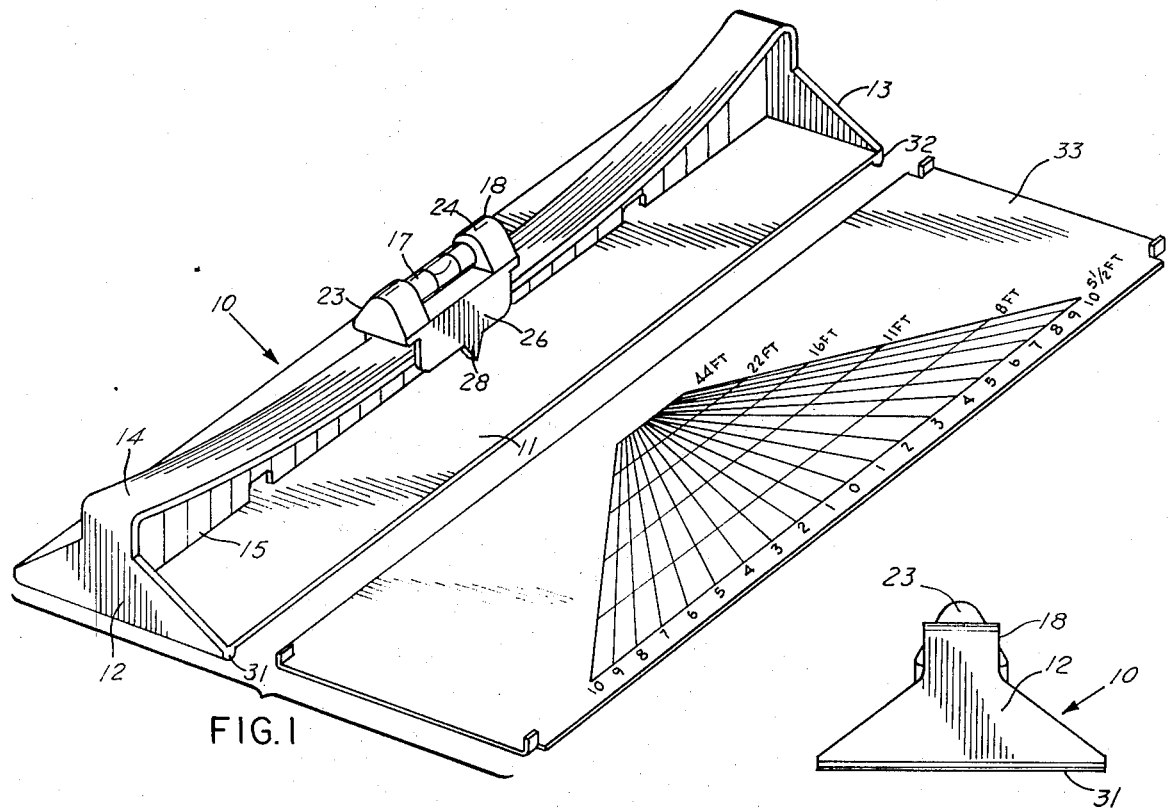
FIG. 1 is a perspective view of the inclinometer as provided in the present invention.
Figure 2:
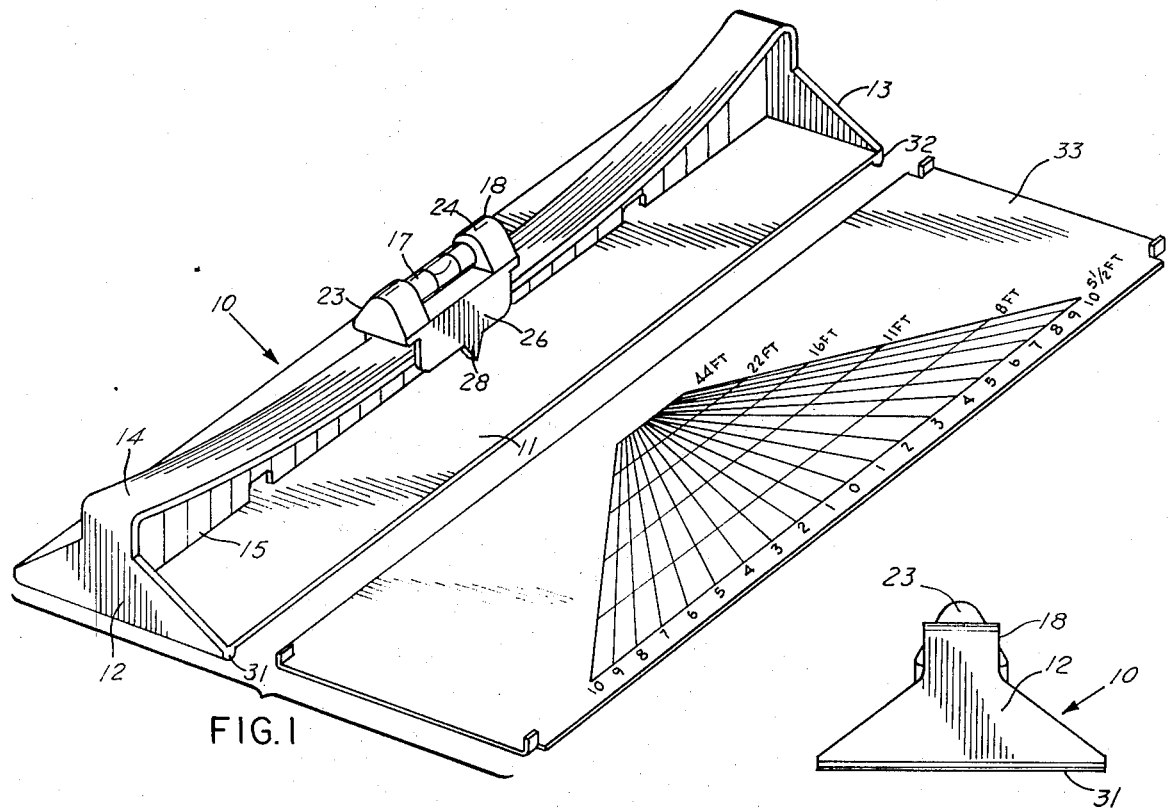
FIG. 2 is an end view of the body of the inclinometer as shown in FIG. 1.
Figure 3:
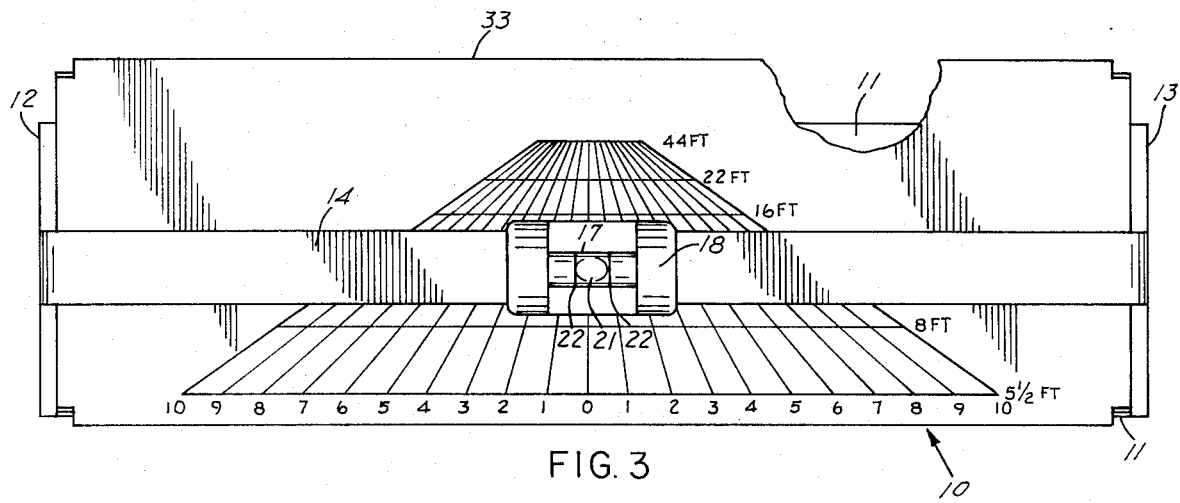
FIG. 3 is a top plan view of the inclinometer.
Figure 4:
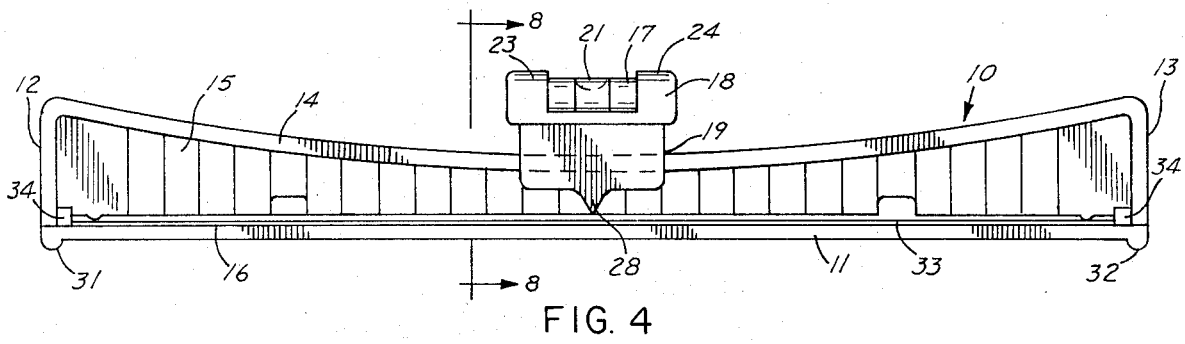
FIG. 4 is a side elevation view of the inclinometer showing the slide saddle with the bubble level positioned in the center of the slide rail arc.

Turning now more specifically to the drawings, FIGS. 1–4 and 8 show the inclinometer 10 which is a major part of the present invention. The calculating slide plate will be included and described hereinbelow. The inclinometer 10 has a base member 11 and upright end members 12, 13. The base member may take any configuration desired but it is preferred that it be arranged in the elongated, rectangular arrangement shown in FIGS. 1 and 3. A wide double flanged slide rail 14 which is arcuate in a concave arrangement as shown in FIG. 4, is suspended equidistant above the base plate 11 and supported by the end members 12, 13. The slide rail 14 is arranged above the longitudinal center line of the base plate 11. A web element 15 is arranged centrally under the slide rail 14 so as to extend perpendicular to the plane of the rail and towards the base plate 11. Element 15 provides rigidity and strength to the slide rail 14 and maintains it in a continuous, predetermined arc. In the present embodiment, the arc of the slide rail 14 has a radius of approximately 18–19 inches. A slot 16, extending the full length of the base member 11, is provided between the web 15 and the base plate 11. The width of the slot 16 is sized to permit the insertion of the slide plate to be described later.

A conventional bubble level is mounted in a saddle 18 for slidable movement along the upper surface of the slide rail 14. An arcuate passageway 19 extends lengthwise through the saddle 18 and is sized to fit the flanges of the slide rail 14. It is to be understood that the radius of the arc of the passageway 19 is to be identical to the radius of the slide rail 14. The bubble level 17 is a sealed plastic or glass container or vial 20 having an air bubble 21 and centering lines 22 for locating and positioning the bubble 21 in the center of the vial 20. The vial 20 is mounted in the end tabs 23, 24 of the saddle 18 so that the upper surface of the vial 20 which identifies the level reference plane is parallel to or concentric with the passageway 19. The sides 25, 26 of the saddle 18 extend downwardly on each side of the saddle to form a pointer indicator 27, 28. The pointers 27, 28 on each side of the saddle are arranged at the center of the vial, midway between the centering line 22, and perpendicular to the level reference plane established by the bubble level 17.

The slide rail 14 is positioned so that the center of the arc corresponds to the lateral centerline of the base member 11. With the saddle 18 positioned at this location, the reference plane of the bubble level 17 is parallel with the base member 11 and the pointers 27, 28 are spaced from the base member to correspond to the upper edge of the slot 16 so as to clear the slide plate. If desired, the sides 25, 26 of the saddle 18 may be arranged to have inwardly extending arms 29, 30 which extend under the flanges of the slide rail 14 so that the saddle cannot be removed from the inclinometer.

The inclinometer is designed so that the base member 11 is positioned on a planar surface of the recreation vehicle or object to be levelled. To compensate for any irregularities that might be present on this surface, lateral ridges 31, 32 which extend the width of the base member 11 can be positioned at each end to form legs for supporting the inclinometer above the surface of the vehicle.

Figure 5:
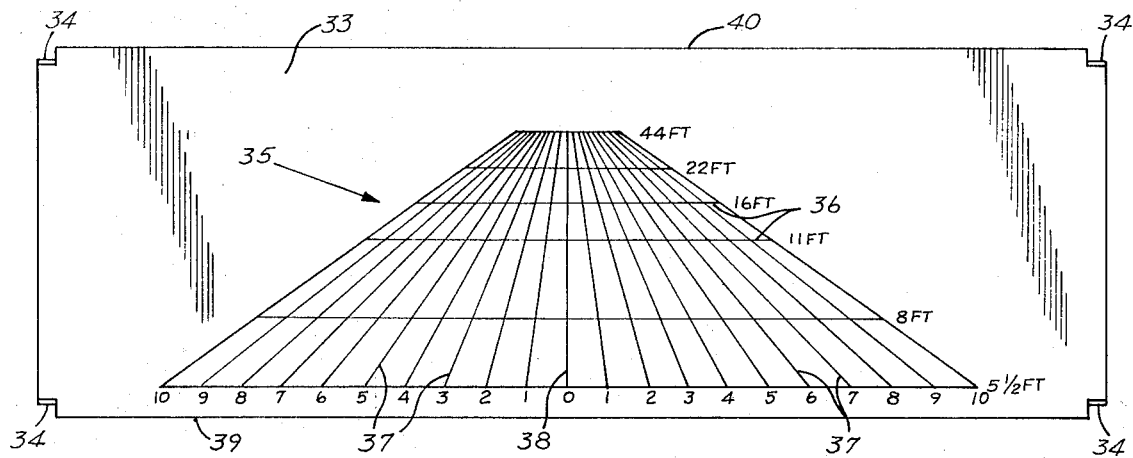
FIG. 5 is a top plan view of the computing slide plate showing the double series of indicia marks on the surface.

A calculating slide plate 33 formed from flat, thin sheet material is shown in FIG. 5. The size of the slide plate 33 is arranged to correspond to the upper surface of the base member 11 so that it can be moved over the surface of the base member in a lateral direction perpendicular to the slide rail 14. Tabs 34 (or dimples in the material) provided at each corner of the slide plate 33 are bent upwardly after the plate 33 is inserted through the slot 16 to prevent its removal. As stated previously, slide plate 33 can then be moved laterally with respect to the slide rail 14 with the tabs 34 preventing either edge of the plate 33 from moving past the web 15 of the inclinometer.

As shown in FIG. 5, an indicia or grid 35 is provided on the upper surface of the plate 33. A length scale having a first series of lines 36 which are arranged parallel to each other and to the longitudinal axis of the slide rail 14 are provided to represent the distance between the supports on the vehicle to be levelled. An elevational correction scale having a second series of lines 37 are arranged to intersect the first series and are symmetrical around the lateral center line 38 of the slide plate 33. This line is also identified by the zero shown near the edge 38 of the slide plate 33. The lines 37 are arranged to converge at an imaginary point on the center line 38 beyond the edge 40 of the slide plate 33. As stated before, these lines are symmetrical with respect to the center line 38 and are angularly spaced from each other an amount calculated from the curve of slide rail. Numbers which represent the elevational correction required for the vehicle are positioned along the edge 39 and identify the respective lines. The position and location of the lines are calibrated with the parallel lines 36 to provide a direct calculated read-out of the actual elevational correction required for levelling the vehicle being checked.

Figure 6:
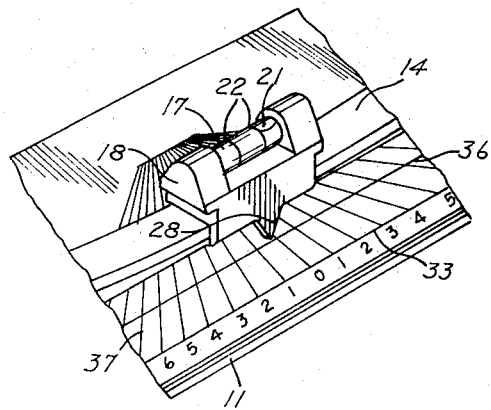
FIG. 6 is a perspective detail showing the slide positioned under the inclinometer slide rail and the bubble carriage positioned in the middle of the rail.
Figure 7:
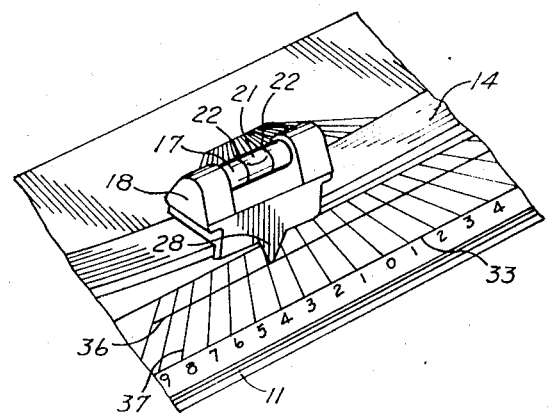
FIG. 7 is a perspective detail showing the calculating inclinometer with the base tilted upwardly toward the right and the bubble level carriage moved to the left of the center line along the arcuate slide rail to a level position.
Figure 8:
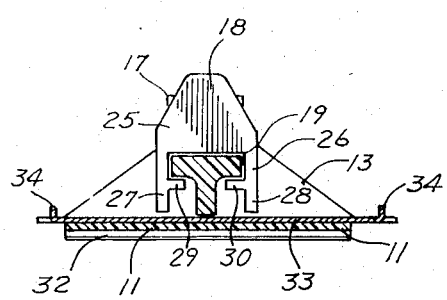
FIG. 8 is a sectional view taken along the line 8—8 of FIG. 4 and shows the flange arrangement of the slide rail and the mounting of the bubble carriage.

To operate the calculating inclinometer 10 as provided in this invention, the base member 11 is positioned on a flat surface of the vehicle to be levelled and arranged so that the longitudinal axis of the base member 11 is positioned either parallel or perpendicular to the longitudinal axis of the vehicle. The distance between the supports in the direction of the longitudinal axis of the inclinometer is measured and the slide 33 is moved so that the corresponding parallel lines for the support distance is positioned under either one of the pointers 27 or 28. If the lines 37 are not calibrated exactly for the actual distance, the slide may be moved to interpolate between the lines for the actual distance. FIG. 6 shows the centered position of the saddle of the level 17 and pointer 28 with the slide plate 33 in its predetermined position for a measurement. The saddle 18 is then moved in one direction or the other until the air bubble 21 is centered between the lines 22 to identify a level reference plane as shown in FIG. 7. The line of the second series 37 which intersects the point 28 identifies which side of the vehicle must be raised and the unit represented by the line identifies the actual elevational distance which that side of the vehicle must be raised to establish a level condition for the vehicle. To level the vehicle in the transverse direction, the inclinometer is rotated 90° and a second measurement is made. With the present invention, it is a simple matter to level the vehicle or object simply by making two measurements with the calculating inclinometer to obtain a suitable level condition.

While a calculating inclinometer has been shown and described in detail, it is obvious that this invention is not to be considered to be limited to the exact form disclosed and that changes in detail and construction may be made therein within the scope of the invention without departing from the spirit thereof.

What is claimed is:

1. A calculating inclinometer for levelling recreation vehicles, such as pickup campers, trailers, mobile homes or the like, the levelling device comprising:
   a. mounting means arranged to be positioned on said vehicle, said mounting means having a planar base member and an arcuate concave slide rail mounted in spaced relation above said base member;
   b. slide means inclusive of bubble level indicator means arranged for slidable movement along said rail, said slide means having depending pointer means disposed toward said flat base member, and
   c. scale support means having indicia imprinted thereon comprising an elevational correction scale and a length scale, said support means being arranged to be slidably moved over said flat base member and below said indicator pointer means, said movement being perpendicular to said movement of said slide means and serving to position a portion of said length scale adjacent to said pointer in order to indicate the elevational correction for a selected length of said vehicle when said slide means is slidably moved along said rail so that the bubble level indicates a level position.

2. An inclinometer as defined in claim 1, wherein: said mounting means further includes a web element extending downwardly from said arcuate slide rail and arranged perpendicular to said flat base member, said web element having a slotted opening along its entire length adjacent to said flat base member whereby said scale support means may be inserted through said slotted opening and across the upper surface of said flat base member.

3. An inclinometer as defined in claim 2, wherein: said scale support means includes a plurality of upwardly extending tabs at each of its corners, said tabs being arranged to contact the web element and prevent removal of the slide of the scale means from the mounting means.

4. An inclinometer as defined in claim 1, wherein: said scale support means is a flat thin plate having a size corresponding to said planar base member, said plate having parallel, equally spaced lines extending longitudinally of the surface of said plate constituting said length scale and transverse converging lines arranged to converge at an imaginary point on a lateral center line of said plate and symmetrical to said center line constituting said elevational correction scale whereby the plate can be positioned so that the parallel lines are parallel to the slide rail and is slidably inserted so that said pointer means aligns with one of said parallel lines which represents the width of the vehicle and the pointer means, in turn, indicates the direction and elevational correction for the vehicle by intersection with one of the converging lines.

5. An inclinometer as defined in claim 1, wherein: said mounting means is integrally formed from a moldable material.

6. An inclinometer as defined in claim 1, wherein: said slide means includes a saddle means having a slotted arcuate passageway arranged to slidably fit said rail whereby said indicator means is permanently attached to said rail to prevent its removal.

7. A calculating inclinometer for levelling recreation vehicles, such as pickup campers, trailers, mobile homes or the like, the levelling device comprising:
   a. mounting means arranged for positioning on said vehicle, said mounting means having an elongated, rectangular base member and an arcuate, concaved slide rail mounted parallel to the longitudinal axis above said base member, said rail being mounted above said base member by upright support means at each end of the rail whereby the ends of the rail are at an equal distance above the base member, said arcuate concave slide rail further including a thin web element arranged to extend between said arcuate rail and said base member, said web element being spaced from said base member to form an elongated, slotted aperture extending the length of said base member;
   b. bubble level indicator means mounted on a saddle means, said saddle means including a curved, slotted opening whereby said bubble level indicator means may be slidably moved along said rail, said saddle means further including a pointer means disposed perpendicular to the level indicator means and towards said base member; and
   c. indicia scale means including a flat, rectangular plate member having a length slightly less than the length of said slotted aperture whereby said plate member may be laterally moved across the upper surface of said base member and through said slotted aperture, said plate member having a plurality of intersecting grid lines comprising an elevational correction scale and a length scale, provided on its upper surface, said movement of said plate member being perpendicular to said movement of said saddle means and serving to position a portion of said length scale adjacent to said pointer in order to indicate the elevational correction for a selected length of said vehicle, whereby as the level indicator means is moved along said rail to a level position, the distance correction for levelling said vehicle is indicated by the intersection of said pointer means with a respective line on said plate member.

8. An inclinometer as defined in claim 7, wherein said plurality of intersecting grid lines includes:
   a. said length scale having a first series of spaced parallel lines which are parallel to the longitudinal axis of said plate and said slide rail, said first series of lines representing the distance between the supports of said vehicle; and
   b. said elevational correction scale having a second series of lines which intersect said first series and angularly converge toward an imaginary point on the lateral center line of said plate, said second series of lines being symmetrical with respect to said center line and calibrated to represent the elevational correction required for the width or length of said vehicle.

\* \* \* \* \*